(12) United States Patent
Withers et al.

(10) Patent No.: US 6,695,974 B2
(45) Date of Patent: Feb. 24, 2004

(54) NANO CARBON MATERIALS FOR ENHANCING THERMAL TRANSFER IN FLUIDS

(75) Inventors: James C. Withers, Tucson, AZ (US); Raouf O. Loutfy, Tucson, AZ (US)

(73) Assignee: Materials and Electrochemical Research (MER) Corporation, Tucson, AZ (US)

( * ) Notice: Subject to any disclaimer, the term of this patent is extended or adjusted under 35 U.S.C. 154(b) by 6 days.

(21) Appl. No.: 10/059,716

(22) Filed: Jan. 29, 2002

(65) Prior Publication Data

US 2002/0100578 A1 Aug. 1, 2002

Related U.S. Application Data

(60) Provisional application No. 60/265,547, filed on Jan. 30, 2001.

(51) Int. Cl.$^7$ .............................. C09K 5/00; C09K 5/10
(52) U.S. Cl. ..................................... 252/70; 165/104.19
(58) Field of Search .................. 252/70; 165/104.19

(56) References Cited

U.S. PATENT DOCUMENTS 6,432,320 B1 * 8/2002 Bonsignore et al. .......... 252/70

FOREIGN PATENT DOCUMENTS

DE  010065671 A1 * 7/2002
EP  001052307 A2 * 11/2000

* cited by examiner

Primary Examiner—Anthony J. Green
(74) Attorney, Agent, or Firm—Jerome M. Teplitz

(57) ABSTRACT

A novel fluid heat transfer agent suitable for use in a closed heat transfer system, for example, wherein energy is transferred between an evaporator and a condenser in heat exchange relationship with the heat transfer agent that is caused to flow from one to the other. The novel heat transfer agent is a complex comprising a body of heat transfer fluid, for example, ethylene glycol or water, having suspended therein carbon nanoparticles in a quantity sufficient to enhance the thermal conductivity of the body of heat transfers fluid, per se. The carbon nanoparticles are selected from carbon in the form of $sp^2$ type and $sp^3$ type bonding and preferably comprise nanotubes or fullerenes and may have a coupling agent bonded thereto or enclosed therein when the nanotube or fullerene forms a hollow capsule. The coupling agent may be a polar organic group covalently bonded to the carbon nanoparticles and miscible in the fluid medium.

52 Claims, No Drawings

NANO CARBON MATERIALS FOR ENHANCING THERMAL TRANSFER IN FLUIDS

This application claims the benefit of U.S. Provisional Application No. 60/265,547, filed Jan. 30, 2001.

BACKGROUND OF THE INVENTION

Improvements in the heat transfer ability of working fluids in thermally-based energy systems can lead to increased conversion efficiencies, lower pollution, decreased costs including operation and maintenance cost, improved reliability, and could facilitate the miniaturization of energy systems. Traditional heat transfer fluids, such as water, oils, ethylene glycol and its mixtures are inherently poor heat transfer fluids, but they have been the classics as nothing better existed. There is a strong need to develop advanced heat transfer fluids, with significantly higher thermal conductivities that achieves improved heat transfer characteristics than are presently available. Despite considerable previous research and development focusing on industrial heat transfer requirements, major improvements in heat transfer capabilities have been held back because of a fundamental limit in the thermal conductivity of conventional fluids. Low thermal conductivity is a primary limitation in the development of energy-efficient heat transfer fluids that are required in a plethora of heat transfer applications.

It has been demonstrated that the addition of metal and oxide nanoparticles that are small enough to remain in suspension in a fluid can substantially enhance the thermal conductivities of the fluid and thus substantially enhance heat transfer. See Choi, "Enhancing Thermal Conductivity of Fluids with Nanoparticles," Developments and Applications of Non-Newtonian Flows, eds. Siginer et al., The American Society of Mechanical Engineers, New York, FED-Vol. 66, pp. 99–105 (Nov. 1995); Lee et al.(I), "Application of Metallic Nanoparticle Suspensions in Advanced Cooling Systems," Recent Advances in Solids/Structures and Application of Metallic Materials, eds. Kwon et al., The American Society of Mechanical Engineers, New York, PVP-Vol. 342/MD-Vol. 72, pp. 227–234 (Nov. 1996); Eastman et al.(I), "Enhanced Thermal Conductivity through the Development of Nanofluids," Invited paper presented at Materials Research Society 1996 Fall Meeting, Boston, Dec. 2–6, 1996, also published in Proceedings of Symposium on Nanophase and Nanocomposite Materials II, Materials Research Society, Boston, Vol. 457, pp. 3–11 (1997); Lee et al.(II), "Measuring Thermal Conductivity of Fluids Containing Oxide Nanoparticles," ASME Tran. J. Heat Transfer, Vol. 121, pp. 280–289 (1999); Wang et al., "Thermal Conductivity of Nanoparticle-Fluid Mixture," J. of Thermophysics and Heat Transfer, Vol. 13, No. 4, pp. 474–480, October–December (1999); Eastman et al.(II), "Anomalously Increased Effective Thermal Conductivities of Ethylene Glycol-Based Nanofluids Containing Copper Nanoparticles," To appear in Applied Physics Letters, 2001; and Masuda et al., "Alteration of Thermal Conductivity and Viscosity of Liquid by Dispersing Ultra-Fine Particles (Dispersion of g-$Al_2O_3$, $SiO_2$ and $TiO_2$ Ultra-Fine Particles)," Netsu Bussei (Japan), Vol 4, No. 4, pp. 227–233 (1993). The smaller the particle size the greater the effect of increasing the nanofluid thermal conductivity as well as the higher the thermal conductivity of the nanoparticle. For example, the thermal conductivity of a nanoparticle copper in a fluid provides a higher thermal conductivity than aluminum oxide because copper metal has a higher thermal conductivity than aluminum oxide.

To improve the suspension of copper in ethylene glycol, Eastman et al II, supra, found that the addition of thioglycolic acid substantially enhanced thermal conductivity of the nanofluid.

BRIEF STATEMENT OF INVENTION

An ideal nanoparticle which has high thermal conductivity is carbon in the structure or type of nanotube or diamond. Nanotubes can be produced in the architecture of single wall, double wall and multiwall. These forms of carbon can be chemically modified by addition of select chemicals that absorb or chemically attach to the carbon surface as well as functionally bond to the surface to provide a stable nanosuspension.

Briefly stated, the present invention is concerned with the provision of a novel heat transfer agent in the form of a fluid complex comprising a body of heat transfer fluid having suspended therein carbon nanoparticles in a quantity sufficient to enhance the thermal conductivity of the heat transfer complex, as compared to that of the body of heat transfer fluid per se.

The novel heat transfer agent, comprising the complex of a nanoparticle suspension in the heat transfer fluid provides improved heat transfer in a method wherein the fluid heat transfer agent is caused to flow in a closed path between first and second bodies, such as an evaporator and condenser of a heat exchange system, with which the fluid passes in heat exchange relationship as it flows through the closed system, thereby transferring heat energy from the warmer to the cooler of said bodies when at different temperatures.

Advantageously, the carbon nanoparticles are selected from carbon in the forms of $sp^2$ and $sp^3$ bonding types, which includes graphite and fullerenes, as well as diamonds.

The preferred form of carbon includes nanotubes, both single-walled and multi-walled.

Advantageously, the invention further involves the use of one or more coupling agents to further enhance the effectiveness of the carbon nanoparticles in the fluid heat exchange complex. Such coupling agents may be chemically bonded to the nanoparticle and may be organic radicals or compounds, organo-metallic radicals or compounds, or individual elements, such as those set forth below in this specification.

When the nanoparticles are of elongated form, such as a nanotube or elongated fullerene, as distinguished from a buckeyball form, the length to diameter ratio (l/d) should be greater than one (1) and preferably greater than two (2).

In one specific embodiment, the suspended nanoparticles consist essentially of fullerenes in the form of a fullerene epoxide and the body of heat transfer fluid comprises water in which the epoxide is soluble.

In another specific example, the suspended nanoparticles consist essentially of nanotubes having an organic coupling agent attached thereto and the body of heat transfer fluid comprises ethylene glycol.

In certain embodiments of the invention, the coupling agent may be incorporated within the molecular structure of the nanotube, which may be a fullerene or nanotube that comprises an endohedral compound encapsulating the coupling agents. Furthermore, the endohedral molecular structures comprising the nanotube may also be modified on its exterior by the provision of one or more coupling agents which, for example, may be radicals or compounds molecularly bonded thereto.

Advantageously, the nanotubes suspended in the fluid complex should have a maximum cross sectional size of about 100 nanometers and preferably of about 25 nanometers.

DESCRIPTION OF PREFERRED EMBODIMENTS

Carbon nanofluids will result in significant energy and cost savings for heat transfer thermal management, and will support the current trend toward miniaturization by enabling the design of smaller and lighter heat exchanger systems. Thermal resistances are reduced and power densities can be increased while dramatically reducing heat exchange pumping power with the use of nanofluids.

The connective heat transfer coefficient can be greatly increased in a solid-fluid two-phase system by adding carbon-based nanoparticles. Some of the reasons heat performance of carbon based nanoparticles in a fluid improve thermal conductivity or heat transfer of the fluid are:

1. The suspended carbon nanoparticles increase the surface area and the heat capacity of the fluid.
2. The suspended carbon nanoparticles increase the effective (or apparent) thermal conductivity of the fluid.
3. The interaction and collision among carbon particles, fluid and the flow passage surface are intensified.
4. The mixing fluctuation and turbulence of the fluid are intensified.
5. The dispersion of carbon nanoparticles flattens the transverse temperature gradient of the fluid.

Some additional factors which can affect heat transfer in carbon nanofluids include:

1. Heat transfer takes place at the surface of the nanoparticles, thus the smaller the carbon nanoparticle and higher the surface area, the greater the potential to enhance heat transfer at a higher rate.
2. When carbon nanoparticles are small enough to behave like molecules in the liquid, the greater the heat transfer potential as well as eliminating agglomeration and clogging in small passages.
3. Motion of nanoparticles cause microconnections that enhances heat transfer, thus smaller higher surface area carbon nanoparticles can increase motion and increase heat transfer.
4. Motions of carbon nanoparticles are strongly influenced by the chemical properties of the particle surface and the hosting fluid, and the configuration of the particle.
5. The concurrent motion of sedimentation, shearing flow and fundamental wave motion probably coexist in nanofluids and thus independently and collectively affect heat transfer.
6. Nanoparticle suspensions increase viscosity of the fluid, but chemically modified carbon nanoparticles have a diminished affect on viscosity.
7. The "square/cube" law that shows that as the surface area of the particle decreases as the square of the length dimension while the volume decreases as the cube of the length dimension, thus the surface area-to-volume ratio increases orders of magnitude the smaller and longer the particle. A corollary is heat transfer could be enhanced if the carbon nanoparticles have a large l/d and/or form chain geometries leading to higher heat transfer along the nanotube length.
8. High mass and/or hard particles can abrade surfaces they contact thus eroding the heat transfer surface. A corollary is soft and/or lubricating (low coefficient of friction) particles reduce the friction coefficient and reduce or eliminate wear.

The instant invention is the utilization of all forms of carbon nanoparticles in all-molecular forms in sizes less than 100 nanometers and preferably less than 50 nanometers and ideally less than 25 nanometers. The carbon forms claimed in the instant invention are as follows:

Nanotubes: Single wall (SWNT), double walled (DWNT) and multi-walled (MWNT) including functionalization of the nanotubes with organic and organo-metallic groups.

Fullerenes/buckyballs: In various molecular weights, $C_{60}$, $C_{70}$, $C_{96}$, $C_{500}$, etc including functionalization of the fullerenes with organic and organo-metallic groups.

Doped nanotubes and fullerenes: (metal and metal compounds internal to the molecular structure, etc) as well as functionalization of the doped or endohederal carbon nanoparticle.

Diamond: including the use of additives that absorb or chemically attach to the surface.

Graphitic forms of carbon in a particle or fibrous architecture with an l/d and including the use of additives that absorb or chemically attach to the surface.

The present invention is the use of carbon nanoforms in any liquid medium to enhance the thermal conductivity of that liquid at any temperature from cryogenic to any temperature wherein a fluid exists. Example fluids are water, ethylene glycol, oils, silicon oils and other fluids that are typically used in heat transfer applications. The instant invention is the use of nanocarbon forms in any liquid to enhance the thermal conductivity. The instant invention includes the use of chemical coupling agents and carbon nanoforms that have addition nuclei chemically bonded to the nanoform. Nuclei that are chemically attached to the carbon nanoform include organic radicals or compounds, organo-metallic radicals or compounds, and individual elements. Individual elements or compounds can be incorporated within the molecular structure such as fullerenes and nanotubes that are often referred to as endohederal compounds. The endohederal molecular compounds may also be modified on the exterior by coupling agents and molecular bonded radicals or compounds.

The instant invention includes fullerenes/buckyballs and nanotubes that have encapsulated within their structure elements such as Si, Ti, V, Cr, Mn, Fe, Co, Ni, Cu, Y, Zr, Mo, Ta, Au, Th, La, Ce, Pr, Nb, Gd, Tb, Dy, Ho, Er, Tm, Yb, Lu, Mo, Pd, Sn, W, as well as alloys of these elements such as for example Co—X where X=S, Bi, Pb, Pt, Y, Cu, B, Mg and compounds such as the carbide i.e. TiC, MoC, etc. Elements, alloys and compounds contained within the core structure of fullerenes/buckyballs and nanotubes of all types can enhance the thermal conductivity of the materials which translates to a higher thermal conductivity nanofluid when these materials are suspended in a heat transfer fluid.

Attaching elements, radicals and compounds to the surface of fullerenes/buckyballs and nanotubes of all types can also enhance their thermal performance as well as aid in suspending them in a fluid. The instant invention includes fullerenes/buckyballs, nanotubes of all types without an element, alloy or compound within its core as well as the material containing an element, alloy or compound within its core as well as diamond particles which contain one or more chemically bonded elements, radicals or compounds. A term often used to describe the attachment of an element, radical or compound is functionalization. Functionalized derivatives can be represented by the general formula: (F(—X—R—Z)n wherein F is a fullerene or nanotube.

Each X is independently —$CH_2$—, —CHY— (where Y=alkyl, aryl or alkylryl), —O—, —S—, —N—, —C(O)—, —$CO_2$—, —CONH—, —CONY— (where Y=alkyl, or aryl), —OP (O)—O$_2$ Each R is independently an alkyl, aryl, alkyl aryl, alkyl ether, aryl ether, alkylaryl ether, or —C(O)—.

And each Z is independently —H, OH, SH, —NH$_2$, NHY (where Y=alkyl, aryl or akyl aryl), —NY$_2$—(where Y=alkyl, aryl, alkylaryl), —NC, CO$_2$Y (where Y=H, alkyl, aryl,) arylalkyl, or a metal cation), alkyl, aryl, alkyl aryl, alkyl ether, aryl ether, alkylaryl ether, Example synthesis methods are as follows, however, any synthesis method is considered acceptable to produce the functionalized compound that is the instant invention of utilizing the functionalized material in a fluid to enhance heat transfer.

Compounds with X=—CH$_2$— or —CHR— in the general formula can be synthesized by reacting the fullerene or the nanotubes in the presence of an olefin, alcohol, or halide terminated compounds in the presence of super acids or a Lewis acid.

Compounds with X=—C(O)—in the general formula can be synthesized by reacting the fullerene or the nanotubes in the presence of carboxylic acid, or anhydride in the presence of super acids or a Lewis acid.

Compounds with X=—C(O)—Y (where Y=O) in the general formula can be synthesized by oxidation in the presence of sulfuric/nitric acids mixture.

Compounds with X=H, alkyl or alkene in the general formula can be synthesized by sonication in an organic solvent.

Compounds with X=O in the general formula can be synthesized by oxidation with hypochlorite followed by acid treatment.

Compounds with X=S in the general formula can be synthesized by oxidation in the presence of a hypothiochlorite.

Compounds with X=N in the general formula can be synthesized by reacting the compound (where X=O and R=H) in the presence of thionyl chloride and an amine followed by hydrogenation of the imine.

All compounds represented by the general formula can be synthesized from the above-described compounds, by common organic reactions such as alkylation, substitution, esterification and amidation.

Anyone skilled in the art can synthesize these examples or other compounds or functionalized derivatives attached to fullerenes in any molecular weight, nanotubes of any type or carbon/diamond particles, but when used in a fluid to enhance thermal transfer is covered by the instant invention.

Another nanoparticle form that is covered by the instant invention includes a metal alloy or compound attached to either or both ends of a nanotube.

Nanotubes are often synthesized using a catalyst of a single metal or metal compound as well as metal alloys. One example is iron ferrocene. When the nanotube is grown a metal or metal compound such as carbide is attached to the tip or end of the nanotube. The nanotube can be utilized as synthesized with the catalyst attached to the tip or removed by dissolution. In the instant invention, the catalyst or purposely-added metal, alloy or compound remains on the nanotube tip and is used in a fluid to enhance the heat transfer characteristics. The instant invention includes the suspension of a nanotube of any type which contains a metal, alloy or compound on one or both ends suspended in a fluid to produce a nanofluid to enhance thermal conductivity.

Certain fullerene and carbon nanotube adducts described above and which we embraced by claims can be specifically named or classified as:

Polyalkyl substituted fullerene adducts and polyalkyl substituted carbon nanontube adducts where F is the fullerene and carbon nanotube core respectively and X is methylene (CH$_2$) and R is a hydrogen (H) or (CH$_2$)$_n$ with n is equal to 1 or greater than 1, and Z is a hydrogen (H).

For example

Polymethyl substituted fullerene adducts and polymethyl substituted carbon nanotube adducts where X is CH$_2$ and R is H.

Polyethyl substituted fullerene adducts and polyethyl substituted carbon nanotube adducts where X and R are CH$_2$ and Z is H.

This group of polyalkyl substituted fullerene and carbon nanotube adducts include higher homologous polyalkyl substituted fullerene and carbon nanotube adducts. The alkyl substituents can be linear, with chain branching or combined.

The polyaryl substituted fullerene adducts and polyaryl substituted carbon nanotube adducts where F is the fullerene and carbon nanotube core respectively and X is an aryl group, benzene, naphthalene or any polynuclear aromatic compounds, R is a hydrogen (H) or (CH$_2$)$_n$ with n is equal to 1 or greater than 1, and Z is a H. The alkyl group on the aromatic core can also be linear, branched or a combination of both.

The polyetheralkyl and aryl fullerene and carbon nanotube adducts where X is an oxygen (O), R is a (CH$_2$)$_n$ with n is equal to 1 or greater than 1, or aryl and Z is an H.

The polythioalkyl and aryl fullerene and carbon nanotube adducts where X is an sulfur (S), R is a (CH$_2$)$_n$ with n is equal to 1 and greater than 1, or aryl and Z is an H.

The polyaminealkyl and aryl fullerene and carbon nanotube adducts, where X is a nitrogen (N), R is an alkyl or aryl, and Z is an H.

The polyketone alkyl and aryl fullerene and carbon nanotube adducts where X is C=O, R is an alkyl or aryl, and Z is an H.

The polyester alkyl and aryl fullerene and carbon nanotube adducts, where X is CO$_2$— and R is an alkyl or aryl and Z is an H.

The polycarboxylic acid fullerene and carbon nanotube adduct, where X is CO$_2$— and R is an H.

The polyamide alkyl and aryl fullerene and carbon nanotube adducts, where X is CO—N, R is an H, an alkyl, or an aryl.

All of the compounds named above may also have functional groups anywhere along their chain. These groups include but are not limited to these following functions Hydroxy (—OH) and ether (—O—R), where R can be an alkyl or aryl Thiol (—SH) and thio-ether (—S—R), where R can be an alkyl or aryl Carboxylic acid (—CO$_2$H)

Ester —CO$_2$R, where R can be an alkyl or aryl

Amine (—NH$_2$, —NHR, or —NR$_1$R$_2$), where R can be an alkyl or aryl

Amide (—CO—NH$_2$, —CO—NHR, or —CO—NR$_1$R$_2$), where R can be an alkyl or aryl Nitro —NO$_2$ Cyano (—CN)

Halide (—Cl, —Br and —F)

Sulfone (—SO$_2$R) and Sulfoxide —S=O(R), where R can be an alkyl or aryl Phosphonic acid —P=O—(OH)$_2$, phosphonate ester —P=O(OR)$_2$ where R can be an alkyl or aryl or H.

Example of enhancement of thermal conductivity is shown as follows:

A glass tube 15 cm in length was filled to the 12 cm level with a liquid and immersed two cm deep into oil heated to 90° C. The glass tube was insulated with a ceramic blanket. A thermocouple was placed just under the surface of the liquid. The time it took the temperature of the liquid to rise 10° C. was taken as an indication if the thermal transfer or thermal conductivity was increased with the use of carbon nanoforms added to the liquid.

EXAMPLE 1

Ethylene glycol was used as the fluid and with no additives it took 8 minutes and 30 seconds for the fluid to increase 10° C. Next, 1 volume percent single wall nanotubes were ultrasonically dispersed in the ethylene glycol and the time measured for the temperature at the surface to increase by 10° C. The time was 7 minutes 13 seconds, or about 15% less than with no nanotubes, thus indicating a higher heat transfer or thermal conductivity of the nanofluid.

EXAMPLE 2

Example 1 was repeated with five volume percent single wall nanotubes. The time it took for the temperature to increase 10° C. was 6 minutes 23 seconds, or about a 25% increase in heat transfer ability.

EXAMPLE 3

Example one was repeated with 10 nanometers diamond particles and a suspending agent of Triton X—100 utilized. The time for the temperature to increase 10° C. was 5 minutes 57 seconds, or about a 30% increase in heat transfer ability.

EXAMPLE 4

Example one was repeated using one volume percent multiwalled nanotubes with an iron catalyst ball remaining on the tip of the nanotube. The time for the temperature to increase 10° C. at the top of the liquid suspension was 5 minutes 37 seconds or about a 34% increase in heat transfer ability.

EXAMPLE 5

A double walled nanotube was stirred in sodium hypochlorite at room temperature for 24 hours. Concentrated HCl was added until the mixture became acid. The mixture is filtered and washed with distilled water and oven dried. The dried nanotube with the attached OH in the presence of a basic solution was stirred with 2—chloro—ethanol ($ClCH_2$ $CH_2$ OH) which produces nanotube-O—$CH_2$ $CH_2$ $CH_2$ OH. This compound was added in one volume percent to ethylene glycol and the time for a 10° C. temperature rise in an experimental set up as described in Example 1 was 5 minutes and 20 seconds or about 37% increase in heat transfer ability.

EXAMPLE 6

Mixed fullerenes containing $C_{60}$, $C_{70}$ and other molecular weights were stirred in tetrahydrofurane (THF) containing powdered sodium in a ratio of 1:6. To this mixture was added propylene epoxide with stirring followed by distilled water to quench the reaction. The product is fullerene-O—$CH_2$—$CH(CH_3)$ OH that makes the fullerene soluble in water. The fullerene epoxide provided a 12% increase in heat transfer over water without the fullerene epoxide.

EXAMPLE 7

Mixed fullerenes were synthesized using a cobalt-doped rod for the arcing that is known in the art to produce an endrohedral fullerene volume percent cobalt endohedral fullerene was sonicated ethylene glycol containing sodium dodecyl sulfate and found to increase the thermal transfer by 28%.

Best Mode or Preferred Embodiment of the Invention

The best mode or preferred embodiment of the invention is to utilize a carbon nanoparticle that has the highest possible thermal conductivity that can be maintained in suspension in reasonable concentration without settling out of the heat transfer fluid. This is preferably attained with single-wall nanotubes containing a covalently bonded functional group that has an interaction with the heat transfer fluid such as water, ethylene glycol, etc. Specifically, a functional group such as a polyether provides excellent suspension retention in water. The polyether is covalently bonded to a nanotube of any type by first oxidizing the nanotubes in a 5.5% aqueous solution of sodium hydrochloride, which is then reacted with hydrochloric acid to provide a pH of 1 to 2, thus forming the polyhydroquinone. This product is washed and reacted with sodium hydroxide to provide a pH greater than 7. The isolated salt of polyhydroquinone is reacted with an equivalent of an organic oxide, such as ethylene oxide to produce a polyether with a terminal alcohol group that provides solubility and suspension of the nanotubes in water.

Diamond in the $sp^3$ bonding form has exceptional high thermal conductivity that can enhance the thermal conductivity of a heat transfer fluid if maintained in suspension. Diamond nanoparticles are preferably mixed with either ethylene glycol or a mixture of water and ethylene glycol containing a polycyclic ether or cyclo dextrin, which surrounds or encapsulates the diamond nanoparticle to maintain the diamond in suspension. Typically one-gram mole of cyclo dextrin or the polycyclic ether is used per gram mole of diamond nanoparticle.

What is claimed is:

1. A fluid complex suitable for use as a heat transfer agent comprising a body of heat transfer fluid having suspended therein carbon nanoparticles comprised of carbon in a form selected from the group consisting of $sp^2$ type bonding and $sp^3$ type bonding in a quantity sufficient to enhance the thermal conductivity of said fluid, as compared to the thermal conductivity of said heat transfer fluid per se.

2. The fluid complex of claim 1, wherein the carbon nanoparticles consist essentially of nanotubes.

3. The fluid complex of claim 1, wherein the carbon nanoparticles consist essentially of diamonds.

4. The fluid complex of claim 2 wherein the carbon nanoparticles consist essentially of multiwalled nanotubes having an original growth iron catalyst ball attached to, at least, one end thereof.

5. The fluid complex of claim 1, wherein the nanoparticles consist essentially of fullerenes.

6. The fluid complex of claim 5, wherein the fullerenes consist essentially of fullerenes in the form of fullerene epoxide.

7. The fluid complex of claim 6, wherein the carbon nanoparticles consist essentially of F—O)—$CH_2$—CH ($CH_3$)OH, wherein F is fullerene.

8. The fluid complex of claim 6, wherein the body of heat transfer fluid comprises water in which the fullerene epoxide is soluble.

9. The fluid complex of claim 7, wherein the body of heat transfer fluid comprises water in which the F—O—CH$_2$—CH(CH$_3$)OH is soluble.

10. The fluid complex of claim 2, wherein the carbon nanoparticles consist essentially of single walled nanotubes.

11. The fluid complex of claim 2, wherein the carbon nanoparticles consist essentially of double walled nanotubes.

12. The fluid complex of claim 11, wherein the double walled nanotubes consist essentially of F—O—CH$_2$CH$_2$CH$_2$OH, wherein F is nanotube.

13. The fluid complex of claim 2, wherein the body of heat transfer fluid comprises ethylene glycol.

14. The fluid complex of claim 12, wherein the body of heat transfer fluid comprises ethylene glycol.

15. The fluid complex of claim 1, wherein the carbon nanoparticles comprise capsule structures having encapsulated therein-another element.

16. The fluid complex of claim 15, wherein the encapsulated element is selected from the group consisting of Si, Ti, V, Cr, Mn, Fe, Co, Ni, Cu, Y, Zr, Mo, Ta, Au, Th, La, Ce, Pr, Nb, Gd, Tb, Dy, Ho, Er, Tm, Yb, Lu, Mo, Pd, Sn, W and alloys of any of these elements.

17. The fluid complex of claim 15, wherein the encapsulated element is present as a compound of such element.

18. The fluid complex of claim 16, wherein the encapsulated element is present as a compound of such element.

19. The fluid complex of claim 15, wherein the capsule structures comprises a fullerene.

20. The fluid complex of claim 16, wherein the capsule structures comprises a fullerene.

21. The fluid complex of claim 17, wherein the capsule structures comprises a fullerene.

22. The fluid complex of claim 19, wherein the capsule structure comprises a fullerene in the form of a buckeyball.

23. The fluid complex of claim 20, wherein the capsule structure comprises a fullerene in the form of a buckeyball.

24. The fluid complex of claim 21, wherein the capsule structure comprises a fullerene in the form of a buckeyball.

25. The fluid complex of claim 17, wherein the capsule structure comprises a nanotube.

26. The fluid complex of claim 16, wherein the capsule structure comprises a nanotube.

27. The fluid complex of claim 17, wherein the capsule structure comprises a nanotube.

28. The fluid complex of claim 5, wherein the fullerene comprises cobalt endohedral fullerene.

29. The fluid complex of claim 28, wherein the body of heat transfer fluid comprises ethylene glycol.

30. The fluid complex of claim 29, wherein the body of heat transfer fluid also contains sodium do-decal sulfate.

31. The fluid complex of claim 1, wherein nanoparticles have a length to diameter (l/d) of greater than one (1).

32. The fluid complex of claim 31, wherein the l/d ratio is at least two (2).

33. The fluid complex of claim 1, wherein the nanoparticles have a cross sectional size of less than 100 nanometers.

34. The fluid complex of claim 33, wherein the nanoparticles have a cross sectional size of less than 25 nanometers.

35. The complex of claim 1, wherein the thermal conductivity of said heat transfer fluid is further enhanced by the presence of a coupling agent in said complex.

36. The complex of claim 35, wherein the coupling agent consists essentially of an organic radical bonded to said nanoparticles.

37. The complex of claim 35, wherein the coupling agent comprises a metallic element.

38. The complex of claim 37, wherein the metallic element is present as a constituent of a metallic alloy.

39. The complex of claim 37, wherein the metallic element is encapsulated within the carbon nanoparticles.

40. The complex of claim 35, wherein the carbon nanoparticle is a fullerene or nanotube, wherein the coupling agent is attached thereto and is a functionalized derivative represented by the formula F(—X —R —Z)n, wherein F is the fullerene or nanotube, wherein each X is independently —CH$_2$—, —CHY— (where Y=alkyl, aryl or alkylryl), —O—, —S—, —N—, —C(O)—, CO$_2$—, —CONH—, —CONY— (where Y=alkyl, or aryl), —OP(O)—O$_2$, wherein each R is independently an alkyl, aryl, alkyl aryl, alkyl ether, aryl ether, alkylaryl ether, or —C(O)— and wherein, each Z is independently —H, OH, SH, —NH$_2$, NHY (where Y=alkyl, aryl or akylaryl), —NC, CO$_2$Y (where Y=H, alkyl, aryl,) arylalkyl, or a metal cation), alkyl, aryl, alkylaryl, alkyl ether, aryl ether, alkylaryl ether.

41. The complex of claim 10, wherein the single-wall nanotubes contain a covalently bonded functional group that has an interaction with the heat transfer fluid to enhance the suspension of the single-wall nanotubes in the heat transfer fluid.

42. The complex of claim 41, wherein the functional group consists essentially of polyether chains bonded to the single-wall nanotubes.

43. The complex of claim 42, wherein the polyether includes a terminal alcohol group that enhances the suspension of the nanotubes in water.

44. The complex of claim 42, wherein the body of heat transfer fluid comprises water.

45. The complex of claim 43, wherein the body of heat transfer fluid comprises water.

46. The complex of claim 3, wherein the diamond nanoparticles are suspended in a body of heat transfer fluid comprising ethylene glycol.

47. The complex of claim 3, wherein the diamond nanoparticles are suspended in a body of heat transfer fluid comprising water.

48. The complex of claim 3, wherein the body of heat transfer fluid is comprised of a mixture of ethylene glycol and water.

49. The complex of claim 46, wherein the diamond nanoparticles are encapsulated in polycyclic ether to enhance their suspension in the heat transfer fluid.

50. The complex of claim 46, wherein the diamond nanoparticles are encapsulated in cyclodextrin to enhance their suspension in the heat transfer fluid.

51. The complex of claim 49, wherein the polycyclic ether is present in equimolar amount of the diamond nanoparticles.

52. The complex of claim 50, wherein the cyclodextrin is present in equimolar amount of the diamond nanoparticles.

* * * * *